(12) United States Patent
Kitahara (10) Patent No.: US 12,385,216 B2
(45) Date of Patent: Aug. 12, 2025

(54) ELECTRIC WORKING MACHINE

(71) Applicant: Yanmar Holdings Co., Ltd., Osaka (JP)

(72) Inventor: Satoshi Kitahara, Fukuoka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 0 days.

(21) Appl. No.: 17/985,931

(22) Filed: Nov. 14, 2022

(65) Prior Publication Data

US 2023/0167623 A1  Jun. 1, 2023

(30) Foreign Application Priority Data

Dec. 1, 2021 (JP) ................. 2021-195469

(51) Int. Cl.
*E02F 9/08* (2006.01)
*E02F 9/20* (2006.01)

(52) U.S. Cl.
CPC .......... *E02F 9/0866* (2013.01); *E02F 9/0858* (2013.01); *E02F 9/207* (2013.01)

(58) Field of Classification Search
CPC ........ E02F 9/0858; E02F 9/0866; E02F 9/207
See application file for complete search history.

(56) References Cited

U.S. PATENT DOCUMENTS

| | | | | |
|---|---|---|---|---|
| 8,631,890 | B2 * | 1/2014 | Noguchi | E02F 9/207 |
| | | | | 180/311 |
| 9,156,341 | B2 * | 10/2015 | Matsumura | B60L 50/51 |
| 2015/0345110 | A1 * | 12/2015 | Takeuchi | E02F 9/2091 |
| | | | | 180/65.21 |
| 2022/0145587 | A1 * | 5/2022 | Takeo | E02F 9/2217 |

FOREIGN PATENT DOCUMENTS

| | | | | |
|---|---|---|---|---|
| EP | 1985767 | A1 * | 10/2008 | ............... B60K 1/04 |
| JP | H0771401 | A * | 3/1995 | |
| JP | H8158407 | A * | 6/1996 | ............ E02F 9/0858 |
| JP | H1121948 | A | 1/1999 | |
| WO | 2007105462 | A1 | 9/2007 | |

OTHER PUBLICATIONS

Machine translation thereof (Year: 1995).*

* cited by examiner

*Primary Examiner* — Matthew Wiblin
(74) *Attorney, Agent, or Firm* — Chris Mizumoto (57) ABSTRACT

A hydraulic excavator as an electric working machine includes: a lower traveling body; an upper turning body that is positioned above the lower traveling body and provided to be turnable with respect to the lower traveling body; an electric motor that is arranged in the upper turning body; and a battery unit that is arranged in the upper turning body and stores electric power for driving the electric motor. The upper turning body includes a turning frame at a bottom. The battery unit is arranged on the turning frame. The electric motor is arranged above the battery unit.

10 Claims, 5 Drawing Sheets

ELECTRIC WORKING MACHINE

CROSS-REFERENCE

This application claims foreign priority of JP2021-195469 filed Dec. 1, 2021, the disclosure of which is hereby incorporated by reference in its entirety.

TECHNICAL FIELD

The present invention relates to an electric working machine.

BACKGROUND ART

Conventionally, there has been proposed a hydraulic excavator that drives a hydraulic actuator by driving a hydraulic pump by an electric motor and supplying hydraulic oil from the hydraulic pump to the hydraulic actuator (see, for example, Patent Document 1).

PRIOR ART DOCUMENT

Patent Document

Patent Document 1: JP-A-2007-211394

SUMMARY OF INVENTION

Technical Problem

In Patent Document 1, a battery for driving an electric motor is positioned at a rear end of an upper turning body. The battery is positioned above the electric motor and the hydraulic pump in the upper turning body. In this arrangement, since the heavy battery is positioned above, the center of gravity of the hydraulic excavator becomes high. As a result, it is difficult to maintain a good machine body balance of the hydraulic excavator. In particular, in a case where a large-capacity battery (for example, a battery unit in which a plurality of batteries is unitized) is used as the battery, it is more difficult to maintain a good machine body balance.

The present invention has been made to solve the above problems, and an object of the present invention is to provide an electric working machine capable of maintaining a good machine body balance even when a large-capacity (large-sized) battery unit is used.

Solution to Problem

An electric working machine according to one aspect of the present invention includes: a lower traveling body; an upper turning body that is positioned above the lower traveling body and provided to be turnable with respect to the lower traveling body; an electric motor that is arranged in the upper turning body; and a battery unit that is arranged in the upper turning body and stores electric power for driving the electric motor, in which the upper turning body includes a turning frame at a bottom, the battery unit is arranged on the turning frame, and the electric motor is arranged above the battery unit.

Advantageous Effects of Invention

Even when a large capacity (large-sized) battery unit is used, it is possible to maintain a good machine body balance.

DESCRIPTION OF EMBODIMENTS

An embodiment of the present invention will be described below with reference to the drawings.

[1. Electric Working Machine]

Figure 1:
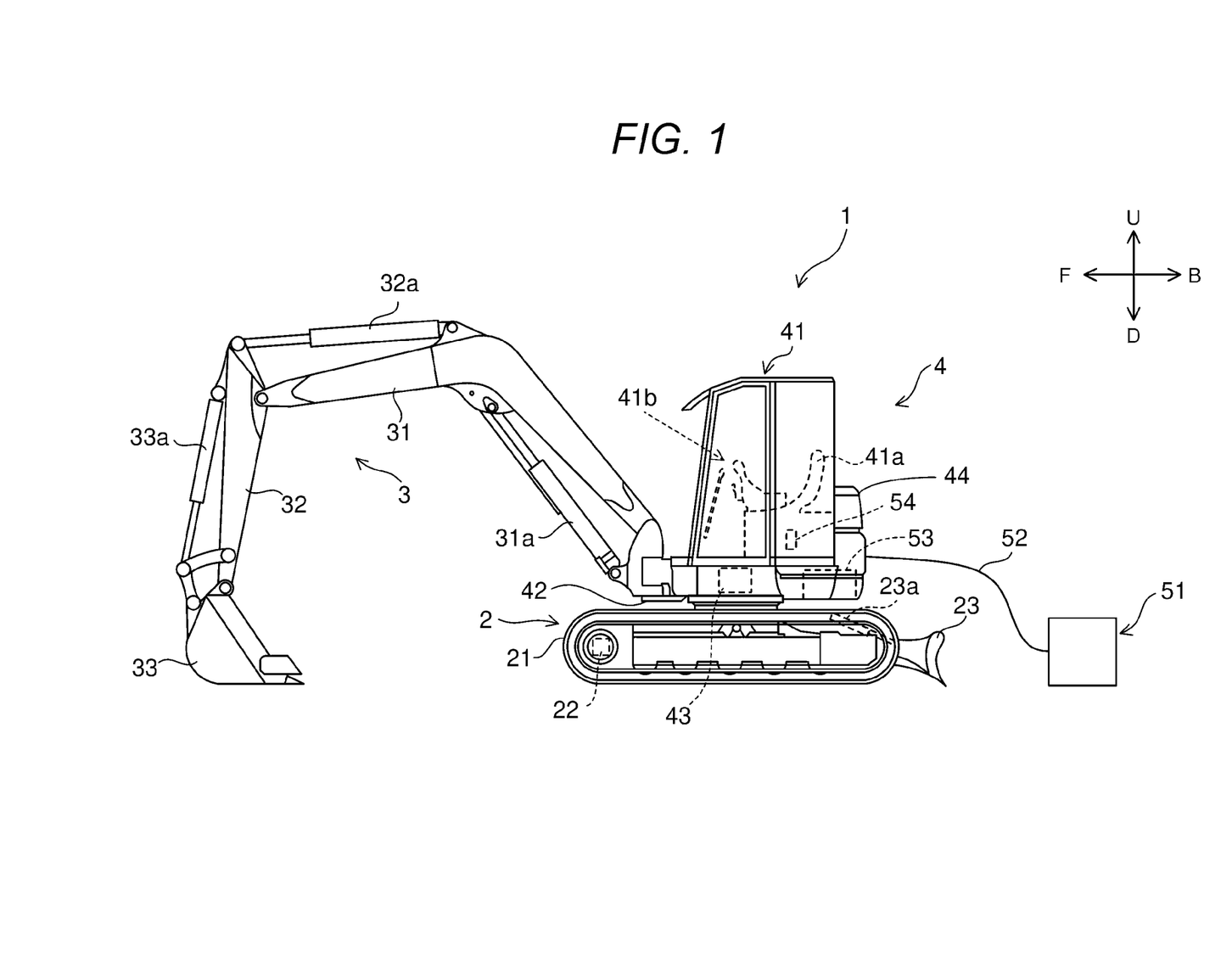
FIG. 1 is a side view illustrating a schematic configuration of a hydraulic excavator which is an example of an electric working machine according to an embodiment of the present invention.

FIG. 1 is a side view illustrating a schematic configuration of a hydraulic excavator (electric shovel) 1 which is an example of an electric working machine according to the present embodiment. The hydraulic excavator 1 includes a lower traveling body 2, a working equipment 3, and an upper turning body 4.

Here, directions are defined as follows. A direction in which an operator (driver) sitting on a driver's seat 41a of the upper turning body 4 faces the front is defined as a front, and the opposite direction is defined as a back. Therefore, in a state where the upper turning body 4 is not turning with respect to the lower traveling body 2 (turning angle: 0°), a front-back direction of the upper turning body 4 coincides with a direction in which the lower traveling body 2 moves forward and backward. In addition, a left side as viewed from the operator sitting on the driver's seat 41a is referred to as "left", and a right side is referred to as "right". Furthermore, a gravity direction perpendicular to the front-back direction and the left-right direction is defined as an up-down direction, an upstream side in the gravity direction is defined as "up", and a downstream side is defined as "down". In the drawings, the upper turning body 4 is shown in a non-turning state with respect to the lower traveling body 2, and as necessary, the front is denoted by "F", the back is denoted by "B", the right is denoted by "R", the left is denoted by "L", the up is denoted by "U", and the down is denoted by "D".

The lower traveling body 2 includes a pair of left and right crawlers 21 and a pair of left and right traveling motors 22. Each traveling motor 22 is a hydraulic motor. The left and right traveling motors 22 drive the left and right crawlers 21, respectively, so that the hydraulic excavator 1 can be moved forward and backward. The lower traveling body 2 is provided with a blade 23 for performing ground leveling work and a blade cylinder 23a. The blade cylinder 23a is a hydraulic cylinder that rotates the blade 23 in the up-down direction.

The working equipment 3 includes a boom 31, an arm 32, and a bucket 33. By independently driving the boom 31, the arm 32, and the bucket 33, excavation work of earth, sand and the like can be performed.

The boom 31 is rotated by a boom cylinder 31a. The base end portion of the boom cylinder 31a is supported by the front portion of the upper turning body 4 and is movable so as to be capable of freely extending and contracting. The arm 32 is rotated by an arm cylinder 32a. The base end portion of the arm cylinder 32a is supported by the distal end portion of the boom 31 and is movable so as to be capable of freely extending and contracting. The bucket 33 is rotated by a bucket cylinder 33a. The base end portion of the bucket cylinder 33a is supported by the distal end portion of the arm 32 and is movable so as to be capable of freely extending and contracting. The boom cylinder 31a, the arm cylinder 32a, and the bucket cylinder 33a are configured with hydraulic cylinders.

The upper turning body 4 is positioned above the lower traveling body 2 and is provided to be turnable with respect to the lower traveling body 2 via a turning bearing (not illustrated). An operation unit 41, a turning frame 42, a turning motor 43, an engine room 44, and the like are arranged in the upper turning body 4. The upper turning body 4 turns via the turning bearing by driving of the turning motor 43 which is a hydraulic motor.

A hydraulic pump 71 (see FIG. 2) is arranged in the upper turning body 4. The hydraulic pump 71 is driven by an electric motor 61 (see FIG. 2) inside the engine room 44. The hydraulic pump 71 supplies hydraulic oil (pressure oil) to a hydraulic motor (for example, the left and right traveling motors 22 and the turning motor 43) and a hydraulic cylinder (for example, the blade cylinder 23a, the boom cylinder 31a, the arm cylinder 32a, and the bucket cylinder 33a). The hydraulic motor and the hydraulic cylinder driven by the hydraulic oil supplied from the hydraulic pump 71 are collectively referred to as a hydraulic actuator 73 (see FIG. 2).

The driver's seat 41a is arranged in the operation unit 41. Various levers 41b are arranged around the driver's seat 41a. When the operator sits on the driver's seat 41a and operates the levers 41b, the hydraulic actuator 73 is driven. As a result, it is possible to perform traveling of the lower traveling body 2, ground leveling work by the blade 23, excavation work by the working equipment 3, turning of the upper turning body 4, and the like.

A battery unit 53 is arranged in the upper turning body 4. The battery unit 53 includes, for example, a lithium ion battery unit, and stores electric power for driving the electric motor 61. The battery unit 53 may be configured by unitizing a plurality of batteries, or may be configured with a single battery cell. In addition, the upper turning body 4 is provided with a power supply port (not illustrated). The above power supply port and a commercial power source 51 as an external power supply are connected via a power supply cable 52. Thus, the battery unit 53 can be charged.

The upper turning body 4 is further provided with a lead battery 54. The lead battery 54 outputs a low-voltage (for example, 12 V) DC voltage. The output from the lead battery 54 is supplied as a control voltage to, for example, a blower fan F (see FIG. 4) to be described later, a system controller 67 (see FIG. 2), and the like.

The hydraulic excavator 1 may have a configuration in which a hydraulic device such as the hydraulic actuator 73 and an actuator driven by electric power are used in combination. Examples of the actuator driven by electric power include an electric traveling motor, an electric cylinder, and an electric turning motor.

[2. Configurations of Control System and Hydraulic System]

Figure 2:
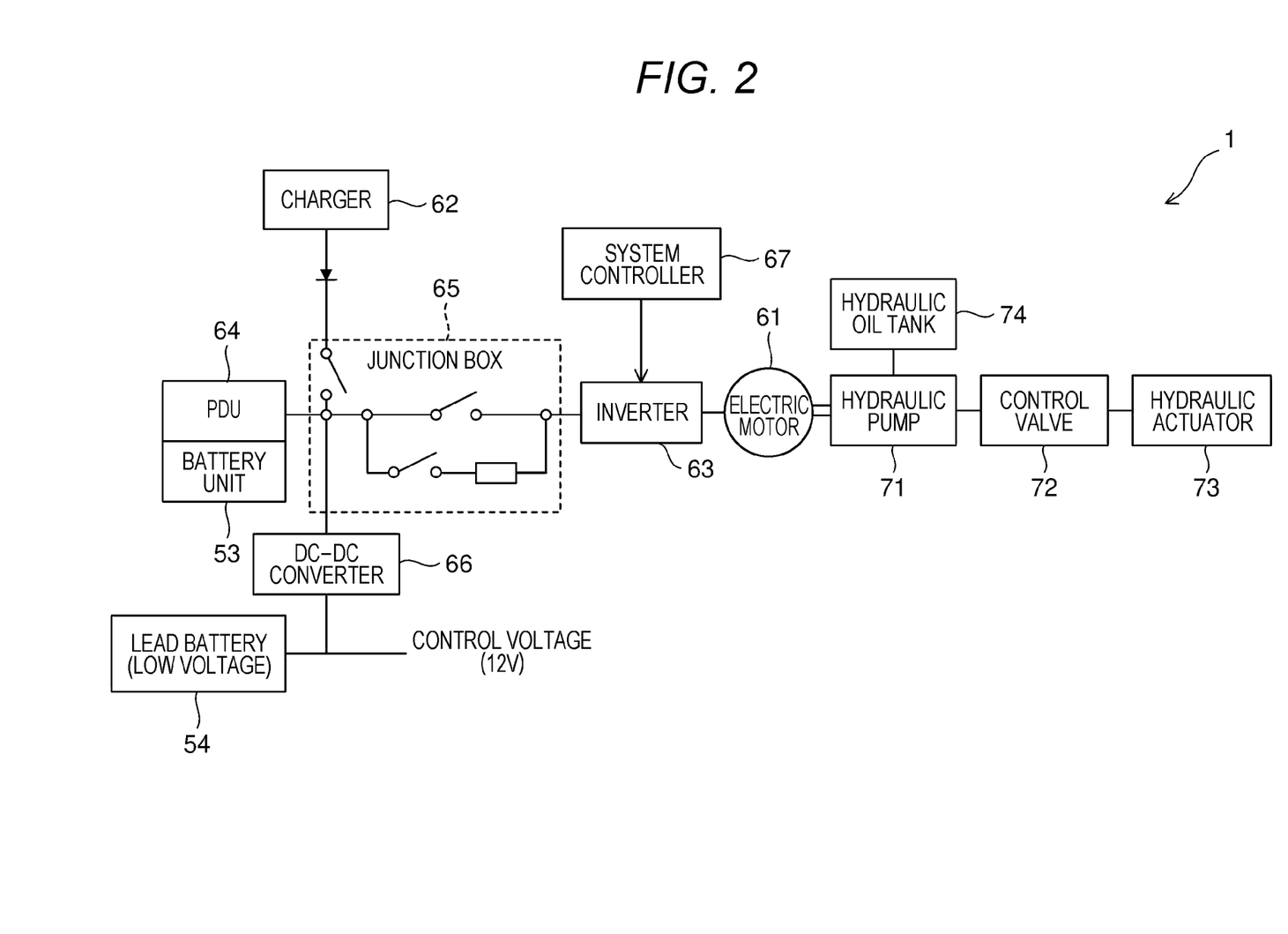
FIG. 2 is a block diagram schematically illustrating configurations of a control system and a hydraulic system of the above hydraulic excavator.

FIG. 2 is a block diagram schematically illustrating configurations of a control system and a hydraulic system of the hydraulic excavator 1. The hydraulic excavator 1 includes the electric motor 61, a charger 62, an inverter 63, a power drive unit (PDU) 64, a junction box 65, a DC-DC converter 66, and the system controller 67. The system controller 67 includes an electronic control unit also called an ECU, and electrically controls each component of the hydraulic excavator 1.

The electric motor 61 is driven by electric power supplied from the battery unit 53 via the junction box 65 and the inverter 63. The electric motor 61 is configured with a permanent magnet motor or an induction motor.

The charger 62 converts an AC voltage supplied from the commercial power source 51 illustrated in FIG. 1 via a power supply cable 52, into a DC voltage. The inverter 63 converts a DC voltage supplied from the battery unit 53, into an AC voltage, and supplies the AC voltage to the electric motor 61. As a result, the electric motor 61 rotates. The AC voltage (current) is supplied from the inverter 63 to the electric motor 61 based on a rotation command output from the system controller 67.

The PDU 64 is a battery control unit that controls an internal battery relay to control input/output of the battery unit 53. The junction box 65 includes a charger relay, an inverter relay, a fuse, and the like. The voltage output from the above charger 62 is supplied to the battery unit 53 via the junction box 65. In addition, the voltage output from the battery unit 53 is supplied to the inverter 63 via the junction box 65.

The DC-DC converter 66 steps down a DC voltage of a high voltage (for example, 300 V) supplied from the battery unit 53, to a low voltage (for example, 12 V). The voltage output from the DC-DC converter 66 is supplied to the blower fan F, the system controller 67, and the like, similarly to the output from the lead battery 54.

A plurality of hydraulic pumps 71 is connected to a rotation shaft (output shaft) of the electric motor 61. The plurality of hydraulic pumps 71 includes a variable displacement pump and a fixed displacement pump. FIG. 2 illustrates only one hydraulic pump 71 as an example. Each hydraulic pump 71 is connected to a hydraulic oil tank 74 that accommodates (stores) hydraulic oil. The hydraulic pump 71 supplies the hydraulic oil in the hydraulic oil tank 74 to the hydraulic actuator 73 via a control valve 72. As a result, the hydraulic actuator 73 is driven. The control valve 72 is a direction switching valve that controls a flow direction and a flow rate of hydraulic oil supplied to the hydraulic actuator 73.

As described above, the hydraulic excavator 1 of the present embodiment includes at least the electric motor 61 and the battery unit 53 arranged in the upper turning body 4 (see FIG. 1). In addition, the hydraulic excavator 1 further includes the hydraulic actuator 73 driven by supply of the hydraulic oil from the hydraulic pump 71.

[3. Arrangement of Components Inside Engine Room]

Figure 3:
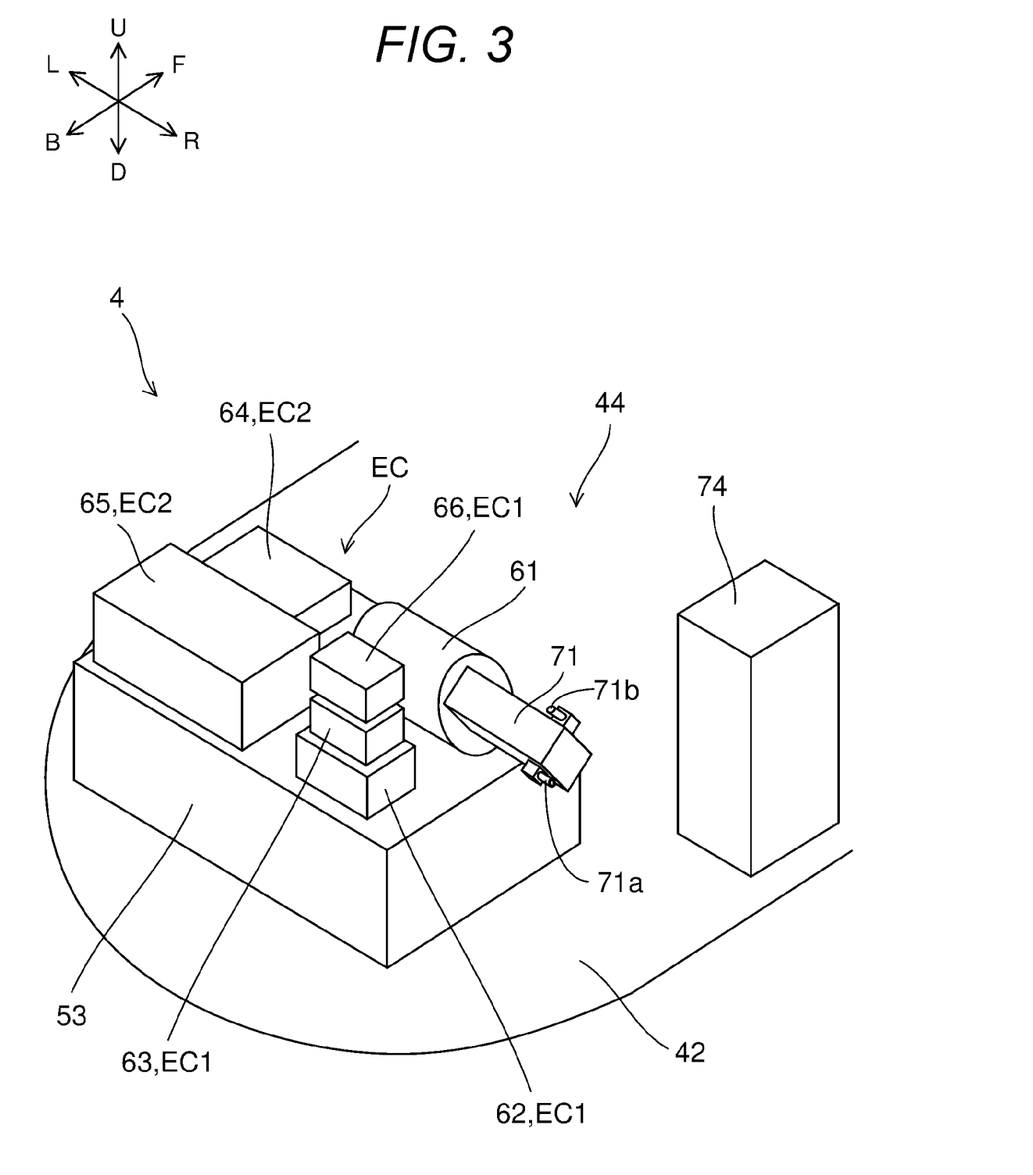
FIG. 3 is a perspective view of an inside of an engine room of an upper turning body included in the above hydraulic excavator, as viewed from behind.
Figure 4:
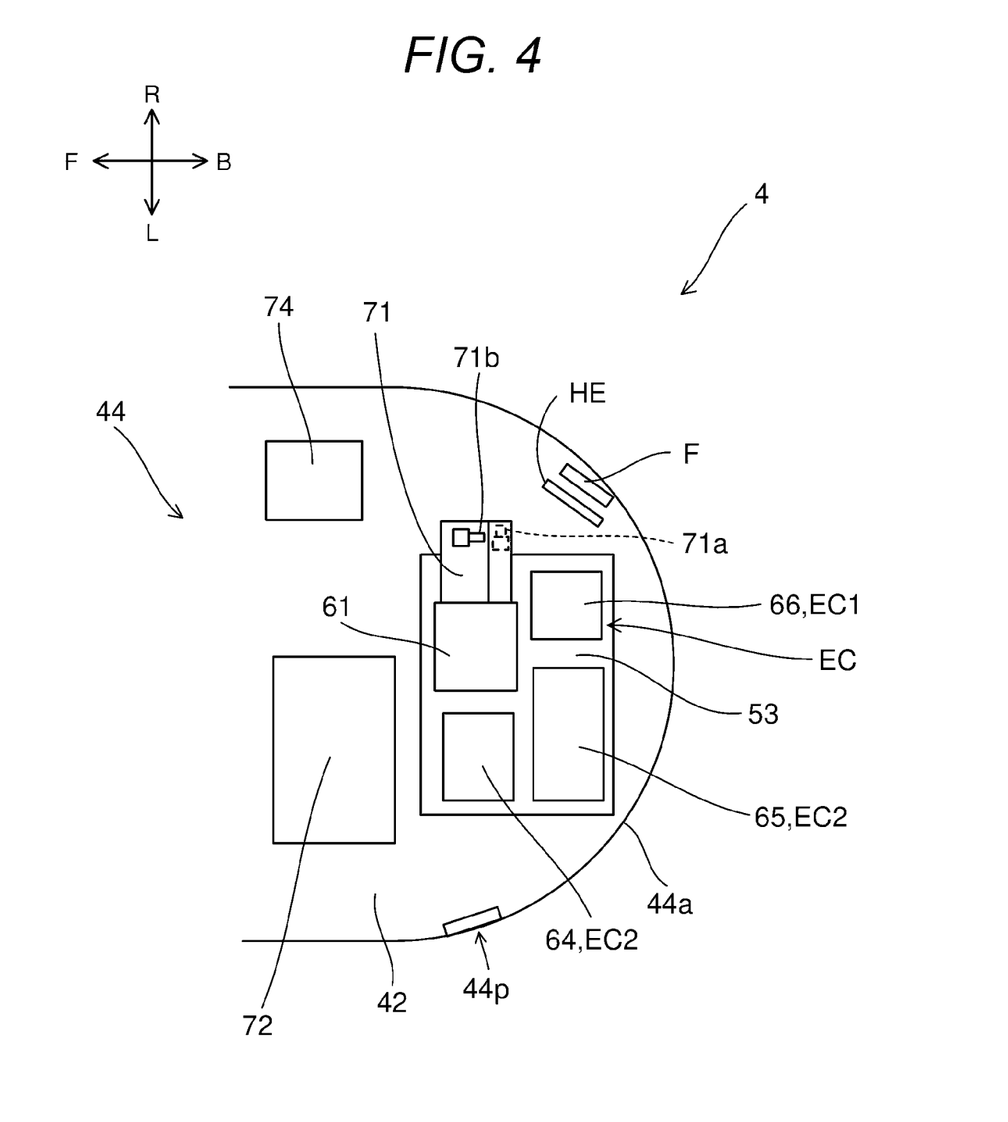
FIG. 4 is a plan view illustrating arrangement of components in the above engine room.
Figure 5:
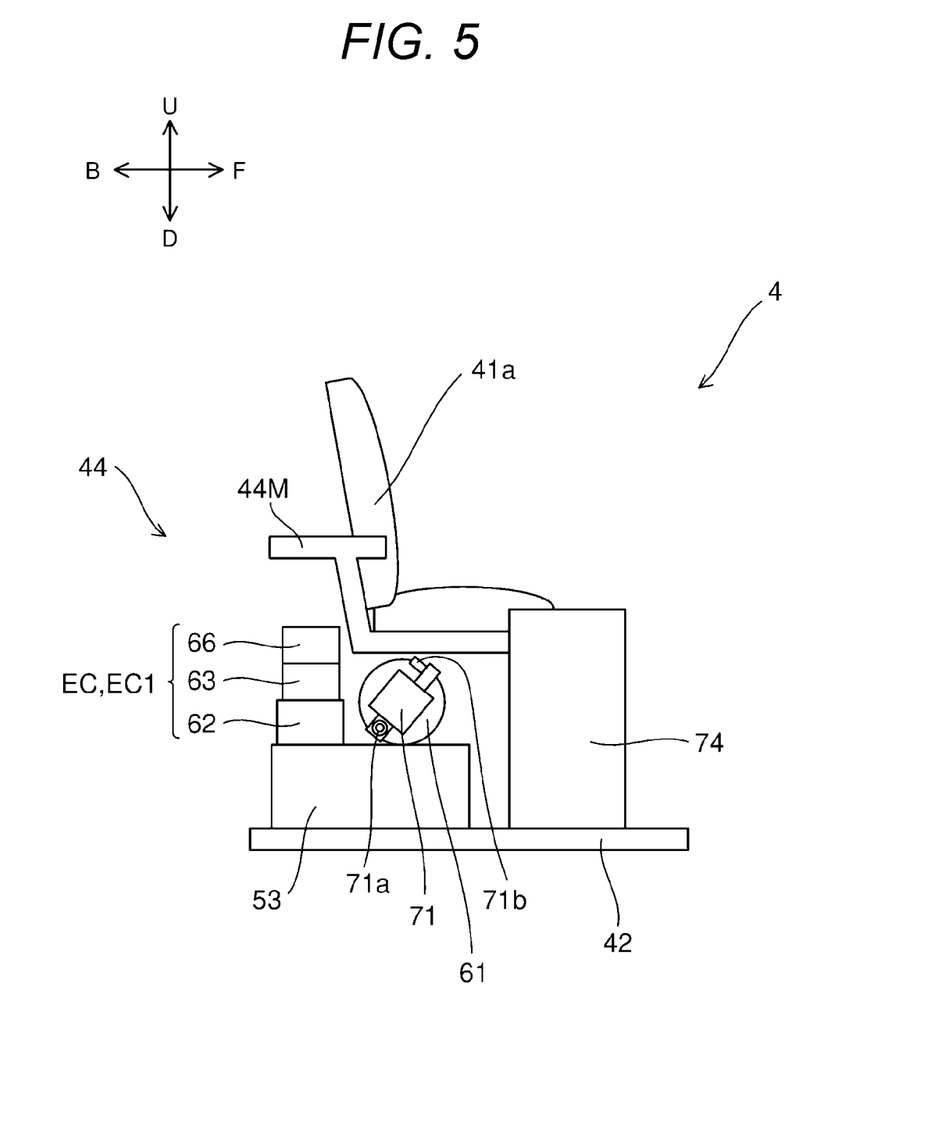
FIG. 5 is a right side view of the inside of the above engine room.

FIG. 3 is a perspective view of an inside of the engine room 44 of the upper turning body 4, as viewed from the back. FIG. 4 is a plan view illustrating arrangement of components in the engine room 44. FIG. 5 is a right side view of the inside of the engine room 44. Note that, in these drawings, for the sake of simplicity, each component is illustrated in a simple rectangular parallelepiped shape or a cylindrical shape, but the actual shape may be different from these shapes. In addition, in FIGS. 3 and 4, illustration of a seat mount 44M illustrated in FIG. 5 is omitted for the sake of convenience. The seat mount 44M configures an upper wall of the engine room 44 and is a base which forms a basis of the driver's seat 41a illustrated in FIG. 1. In addition, in FIGS. 3 and 5, the blower fan F and a heat exchanger HE illustrated in FIG. 4 are not illustrated for the sake of convenience.

(3-1. Arrangement of Electric Motor)

The upper turning body 4 has the turning frame 42 at the bottom. The turning frame 42 configures a bottom plate of the upper turning body 4. The above battery unit 53 is arranged on the turning frame 42. In particular, the battery unit 53 is arranged at a back position on the turning frame 42. The electric motor 61 is arranged above the battery unit 53. In particular, the electric motor 61 is arranged between the battery unit 53 and the seat mount 44M inside the engine room 44. The electric motor 61 is positioned above the battery unit 53 in a manner that an output shaft which outputs power to the hydraulic pump 71 is along the left-right direction.

Note that, an anti-vibration structure in which an anti-vibration rubber, a stay, a housing, and the like are combined exists between the battery unit 53 and the turning frame 42, but illustration of the above anti-vibration structure is omitted in the drawings. In addition, the electric motor 61 is supported and arranged by a support structure such as a stay and a housing, above the battery unit 53.

Normally, the battery unit 53 is heavier than the electric motor 61. Moreover, the battery unit 53 increases in size as its capacity increases. Since the electric motor 61 is disposed above the battery unit 53 as in the present embodiment, the center of gravity of the machine body (the hydraulic excavator 1, in particular, the upper turning body 4) can be kept low even when the large-capacity (large-sized) battery unit 53 is arranged on the turning frame 42. As a result, it is possible to maintain a good machine body balance. Therefore, even when the hydraulic actuator 73 is driven to perform work, the work can be satisfactorily performed in a stable posture of the hydraulic excavator 1.

In addition, the hydraulic excavator 1 also includes the driver's seat 41a on which the operator sits. As illustrated in FIG. 5, the driver's seat 41a is positioned above the electric motor 61. In this configuration, when viewed from above, the driver's seat 41a and the electric motor 61 are in a positional relationship of overlapping each other, and therefore, the length of the upper turning body 4 in the front-back direction can be shortened. As a result, it is easy to downsize the upper turning body 4 and realize the small hydraulic excavator 1 having a small turning radius.

(3-2. Arrangement of Hydraulic Pump)

The hydraulic pump 71 described above is arranged on the side of the electric motor 61 (on the right side in FIG. 4 and the like), and is arranged at a position higher than the battery unit 53, similarly to the electric motor 61. An input shaft of the hydraulic pump 71 is connected to an output shaft of the electric motor 61. Therefore, the hydraulic pump 71 is positioned in a manner that the input shaft is along the left-right direction. That is, the electric motor 61 and the hydraulic pump 71 are arranged side by side in the left-right direction of the upper turning body 4. Similarly to the electric motor 61, the hydraulic pump 71 is also supported by the support structure such as the stay and the housing. Note that a part of the hydraulic pump 71 is positioned above the battery unit 53, and the rest protrudes laterally (for example, rightward) from above the battery unit 53 (see FIG. 4). This point will be described later in detail.

As described above, since the hydraulic pump 71 is arranged at a position higher than the battery unit 53, the hydraulic pump 71 can be arranged side by side with the electric motor 61 (for example, in the left-right direction) in the upper turning body 4 (in particular, in the engine room 44). That is, the hydraulic pump 71 can be arranged close to the electric motor 61. As a result, the compact arrangement of the hydraulic pump 71 and the electric motor 61 is realized in the upper turning body 4, and the upper turning body 4 can be easily downsized. As a result, it is easy to realize the small hydraulic excavator 1 having a small turning radius.

In particular, since the electric motor 61 and the hydraulic pump 71 are arranged side by side in the left-right direction, it is easy to realize a layout in which the electric motor 61 is arranged above the battery unit 53 and a part of the hydraulic pump 71 protrudes (is offset) laterally from the battery unit 53 as in the present embodiment. With this layout, even when a hydraulic hose (not illustrated) is detached from the hydraulic pump 71 at the time of maintenance of the hydraulic pump 71, it is possible to reduce the possibility that the hydraulic oil drips from a connection port with the hydraulic hose in the hydraulic pump 71 and adheres to the battery unit 53.

Hereinafter, details of a configuration that achieves the above effect will be described. As illustrated in FIG. 2, the hydraulic excavator 1 of the present embodiment includes: the hydraulic actuator 73 driven by the supply of the hydraulic oil from the hydraulic pump 71; and the hydraulic oil tank 74 that accommodates the hydraulic oil. As illustrated in FIGS. 3 to 5, the hydraulic oil tank 74 is arranged in front of the hydraulic pump 71 in the engine room 44.

In addition, the hydraulic pump 71 has a suction port 71a and a discharge port 71b. The suction port 71a and the hydraulic oil tank 74 are connected by a hydraulic hose (not illustrated). Therefore, the hydraulic oil supplied from the hydraulic oil tank 74 via the above hydraulic hose enters the pump through the suction port 71a. On the other hand, the discharge port 71b discharges hydraulic oil from the hydraulic pump 71 toward the hydraulic actuator 73. The hydraulic oil discharged from the discharge port 71b is supplied to the hydraulic actuator 73 via another hydraulic hose (not illustrated) and the control valve 72 (see FIG. 2). Note that, although only one discharge port 71b is illustrated in the drawings, the discharge ports 71b may be provided so that the number of the discharge ports 71b is equal to or more than the number of sections of the control valve 72.

As described above, the hydraulic pump 71 includes: the suction port 71a through which the hydraulic oil supplied from the hydraulic oil tank 74 passes; and the discharge port 71b through which the hydraulic oil flowing toward the hydraulic actuator 73 passes. Then, as illustrated in FIGS. 4 and 5, the suction port 71a and the discharge port 71b are positioned to be shifted from the battery unit 53 in the left-right direction. That is, when viewed from above, the suction port 71a and the discharge port 71b are positioned on the right of the right side surface of the battery unit 53, and are not positioned to overlap the battery unit 53.

Generally, when hydraulic oil adheres to an electric component, the electric component may malfunction. According to the positional relationship between the suction port 71a and the discharge port 71b and the battery unit 53 described above, even if the hydraulic oil drips from the suction port 71a or the discharge port 71b of the hydraulic pump 71 when the hydraulic hose is detached from the hydraulic pump 71 for maintenance of the hydraulic pump 71, the hydraulic oil can be reduced from adhering to the battery unit 53. As a result, it is possible not only to reduce the situation in which the battery unit 53 is contaminated by the hydraulic oil, but also to reduce malfunction of the battery unit 53 due to adhesion of the hydraulic oil.

(3-3. Arrangement of Electrical Components)

The charger 62, the inverter 63, the PDU 64, the junction box 65, and the DC-DC converter 66 described above are collectively referred to as electrical components EC. In the upper turning body 4 (in particular, the engine room 44), the electrical components EC are positioned above the battery unit 53, similarly to the electric motor 61. In the present embodiment, the junction box 65 is positioned above the battery unit 53 and on the left back side of the electric motor 61. In addition, the PDU 64 is positioned above the battery unit 53 and on the left side of the electric motor 61. Furthermore, above the battery unit 53 and behind the electric motor 61, the charger 62, the inverter 63, and the DC-DC converter 66 are positioned in this order from below.

Note that the positional relationship among the electrical components EC is merely an example, and the present invention is not limited to this positional relationship. In addition, the positional relationship in the up-down direction among the charger 62, the inverter 63, and the DC-DC converter 66 is not limited to the positional relationship illustrated in FIG. 3 and the like, and the arrangement positions can be replaced with each other in the up-down direction. Each electrical component EC is supported on the battery unit 53 by the support structure such as the stay and the housing.

As described above, the hydraulic excavator 1 further includes the electrical components EC, which are positioned above the battery unit 53 in the upper turning body 4 (in particular, the engine room 44) while shifted from the electric motor 61 in at least one of the front-back direction and the left-right direction.

In the above arrangement of the electrical components EC, the remaining space other than the arrangement space of the electric motor 61 above the battery unit 53 can be effectively used as the arrangement space of the electrical components EC. As a result, it is easy to make the upper turning body 4 compact and realize the small hydraulic excavator 1 having a small turning radius. In addition, even if the electrical components EC are arranged on the battery unit 53 via the support structure, only the above-described anti-vibration measure (anti-vibration structure) for the battery unit 53 can also serve as an anti-vibration measure for the electrical components EC positioned above the battery unit 53. Therefore, it is not necessary to take a separate anti-vibration measure for each electrical component EC, and the support structure of the electrical component EC can be simplified.

In particular, as illustrated in FIGS. 3 to 5, the electrical components EC include a first electrical component EC1 positioned behind the electric motor 61. That is, above the battery unit 53, the electric motor 61 is positioned in front of the first electrical component EC1. In the above example, the first electrical component EC1 includes the charger 62, the inverter 63, and the DC-DC converter 66. Note that the first electrical component EC1 may be any one or any two of the charger 62, the inverter 63, and the DC-DC converter 66.

Among the plurality of electrical components EC, electrical components other than the first electrical component EC1 are also referred to as a second electrical component EC2. In the above example, the second electrical component EC2 corresponds to the PDU 64 and the junction box 65. Note that at least one of the PDU 64 and the junction box 65 may be replaced with any one of the first electrical components EC1 and used as the first electrical component EC1. Since the electric motor 61 is positioned in front of the first electrical component EC1, the following effects can be obtained.

For example, in the configuration in which the electric motor 61 is positioned behind the first electrical component EC1, in order to prevent the electric motor 61 and the hydraulic pump 71 positioned side by side in the left-right direction from protruding from the back portion (circular portion) of the upper turning body 4, the upper turning body 4 has to be formed in a shape having a large turning radius.

On the other hand, in the configuration in which the electric motor 61 is positioned in front of the first electrical component EC1 as in the present embodiment, a space for arranging the electric motor 61 and the hydraulic pump 71 side by side in the left-right direction can be secured near the center of the turning frame 42. Therefore, it is not necessary to form the upper turning body 4 in a shape having a large turning radius. That is, even when the electric motor 61 and the hydraulic pump 71 are arranged side by side in the left-right direction, it is possible to avoid an increase in size of the upper turning body 4.

In addition, the hydraulic pump 71 arranged side by side with the electric motor 61 in the left-right direction is also positioned in front of the first electrical component EC1. Therefore, as illustrated in FIG. 4, the distance between the hydraulic oil tank 74 and the hydraulic pump 71 can be shortened in the engine room 44. Therefore, the hydraulic hose connecting the hydraulic oil tank 74 and the hydraulic pump 71 can be easily routed.

(3-4. Arrangement of Blower Fan, Heat Exchanger, and Opening)

As illustrated in FIG. 4, the blower fan F is arranged on the right back in the engine room 44. The blower fan F circulates air between the inside and the outside of the engine room 44. The blower fan F is arranged inside a hood 44a serving as a side cover of the engine room 44. The blower fan F is configured as, for example, an exhaust fan that discharges air inside the engine room 44 to the outside, but may be configured as an intake fan that takes air outside the engine room 44 into the inside. That is, the blower fan F may be an exhaust type or an intake type.

In addition, the heat exchanger HE is arranged on the turning frame 42 at a position facing the blower fan F. The heat exchanger HE includes: a radiator that performs heat exchange of the cooling medium; and an oil cooler that performs heat exchange of the hydraulic oil. When the air generated by driving of the blower fan F is applied to the heat exchanger HE, the cooling medium and the hydraulic oil are cooled by heat exchange. In the present embodiment, the cooling medium is supplied to the battery unit 53 and the electric motor 61. That is, the battery unit 53 and the electric motor 61 are of a water-cooling type. In addition, the charger 62, the inverter 63, the PDU 64, and the DC-DC converter 66 are of an air-cooling type. Note that the electric motor 61 may be the air-cooling type.

In addition, an opening 44P is formed in the hood 44a on the left side of the engine room 44. The formation position of the opening 44P is not particularly limited, but the opening 44P may be formed anywhere as long as the opening 44P is positioned on the side opposite to the blower fan F with respect to the battery unit 53 in the left-right direction.

As described above, the upper turning body 4 includes the engine room 44, the blower fan F, and the opening 44P. The engine room 44 includes the turning frame 42, and accommodates the battery unit 53, the electric motor 61, the hydraulic pump 71, and the first electrical component EC1. The blower fan F is positioned on one side (right side in FIG. 4) of the engine room 44 in the left-right direction, and circulates air between the inside and the outside of the engine room 44. The opening 44P is positioned on the other side (the left side in the example of FIG. 4) of the engine room 44 in the left-right direction.

In this configuration, when the blower fan F is driven, the air can flow from one side to the other side in the left-right direction above the battery unit 53 and behind the electric motor 61 in the engine room 44. For example, air can be sucked into the engine room 44 from the left side of the engine room 44 via the opening 44P and guided to the back side of the electric motor 61, and the above air can be discharged to the right side of the engine room 44 by the blower fan F. Then, in the configuration in which the first electrical component EC1 is positioned behind the electric motor 61, the first electrical component EC1 can be located in the above air flow path. This makes it possible to efficiently cool the first electrical component EC1 by applying the above air to the first electrical component EC1.

In particular, the first electrical component EC1 includes at least one of the charger 62, the DC-DC converter 66, and the inverter 63. In this case, at least one of the charger 62, the DC-DC converter 66, and the inverter 63 can be reliably cooled by driving of the blower fan F.

In the above description, the hydraulic excavator 1 which is a construction machine has been described as an example of the electric working machine. However, the electric working machine is not limited to the hydraulic excavator 1, and may be another construction machine such as a wheel loader. In addition, the electric working machine may be an agricultural machine such as a combine harvester or a tractor.

Although the embodiment of the present invention has been described above, the scope of the present invention is not limited to this, and may be expanded or modified without departing from the gist of the invention.

INDUSTRIAL APPLICABILITY

The present invention is applicable to work machines such as construction machines and agricultural machines.

LIST OF REFERENCE SIGNS

1 Hydraulic excavator (electric working machine)
2 Lower traveling body
4 Upper turning body
41a Driver's seat
42 Turning frame
44 Engine room
44P Opening
53 Battery unit
61 Electric motor
62 Charger
63 Inverter
66 DC-DC converter
71 Hydraulic pump
71a Suction port
71b Discharge port
73 Hydraulic actuator
74 Hydraulic oil tank
F Blower fan
EC Electrical component
EC1 First electrical component

The invention claimed is:

1. An electric working machine comprising:
a lower traveling body;
an upper turning body that is positioned above the lower traveling body and provided to be turnable with respect to the lower traveling body;
an electric motor that is arranged in the upper turning body;
a battery unit that is arranged in the upper turning body and stores electric power for driving the electric motor;
a hydraulic pump that is arranged in the upper turning body and driven by the electric motor,
a hydraulic actuator that is driven by supply of hydraulic oil from the hydraulic pump; and
a hydraulic oil tank that accommodates the hydraulic oil,
wherein the upper turning body includes a turning frame at a bottom, the battery unit is arranged on the turning frame, and the electric motor is arranged above the battery unit and
wherein a part of the hydraulic pump protrudes laterally from the battery unit, an electrical component is laterally arranged next to the electric motor, and the electrical component, the electric motor, and the hydraulic pump are arranged in a row in a horizontal direction above the battery unit.

2. The electric working machine according to claim 1, wherein the hydraulic pump is arranged at a position higher than the battery unit.

3. The electric working machine according to claim 2, wherein
the electric motor and the hydraulic pump are arranged side by side in a left-right direction of the upper turning body.

4. The electric working machine according to claim 3, wherein
another electrical component that is positioned above the battery unit in the upper turning body is in front of or behind the electric motor.

5. The electric working machine according to claim 4, wherein
the another electrical component includes a first electrical component positioned behind the electric motor.

6. The electric working machine according to claim 5, wherein
the upper turning body includes:
an engine room that includes the turning frame and accommodates the battery unit, the electric motor, the hydraulic pump, and the first electrical component;
a blower fan that is positioned on a side portion, on one side in the left-right direction, of the engine room and circulates air between an inside and an outside of the engine room; and
an opening that is positioned on a side portion, on another side in the left-right direction, of the engine room.

7. The electric working machine according to claim 6, wherein
the first electrical component includes at least one of:
a charger that converts an AC voltage supplied from a commercial power source, into a DC voltage;
a DC-DC converter that steps down the DC voltage output from the charger or a DC voltage supplied from the battery unit; and
an inverter that converts the DC voltage supplied from the battery unit, into an AC voltage, and supplies the AC voltage to the electric motor.

8. The electric working machine according to claim 5, wherein
the upper turning body includes:
an engine room that includes the turning frame and accommodates the battery unit, the electric motor, the hydraulic pump, and the first electrical component.

9. The electric working machine according to claim 8, wherein
the first electrical component includes at least one of:
a charger that converts an AC voltage supplied from a commercial power source, into a DC voltage;
a DC-DC converter that steps down the DC voltage output from the charger or a DC voltage supplied from the battery unit; and
an inverter that converts the DC voltage supplied from the battery unit, into an AC voltage, and supplies the AC voltage to the electric motor.

10. The electric working machine according to claim 1, further comprising:
a driver's seat on which an operator sits,
wherein the driver's seat is positioned above the electric motor.

* * * * *